United States Patent
Shen et al.

(10) Patent No.: US 9,835,928 B1
(45) Date of Patent: Dec. 5, 2017

(54) OPTICAL N-LEVEL QUADRATURE AMPLITUDE MODULATION (NQAM) TUNED BY DITHERING ASSOCIATED HEATERS

(71) Applicant: Futurewei Technologies, Inc., Plano, TX (US)

(72) Inventors: Jinxi Shen, San Ramon, CA (US); Zhong Shi, Dublin, CA (US); Na Shan, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/430,714

(22) Filed: Feb. 13, 2017

(51) Int. Cl.
  *G02F 1/225* (2006.01)
  *G02F 1/01* (2006.01)
  *H04B 10/54* (2013.01)
  *G02F 1/21* (2006.01)

(52) U.S. Cl.
  CPC .......... *G02F 1/2255* (2013.01); *G02F 1/0147* (2013.01); *H04B 10/541* (2013.01); *G02F 2001/212* (2013.01); *G02F 2201/58* (2013.01)

(58) Field of Classification Search
  CPC . G02F 1/01; G02F 1/0147; G02F 1/21; G02F 1/225; G02F 2001/212; G02F 2201/58; H04B 10/54; H04B 10/541
  See application file for complete search history.

(56) References Cited

U.S. PATENT DOCUMENTS

| | | | |
|---|---|---|---|
| 7,369,290 B1 * | 5/2008 | Cox | G02F 1/0123 359/238 |
| 7,729,621 B2 | 6/2010 | Nahapetian et al. | |
| 8,059,970 B2 | 11/2011 | Harley et al. | |
| 8,340,523 B2 * | 12/2012 | Shen | G02F 1/225 398/85 |
| 8,983,244 B2 * | 3/2015 | Shen | G02F 2/00 385/14 |
| 9,164,349 B2 * | 10/2015 | Hayashi | G02F 1/011 |
| 9,374,173 B2 | 6/2016 | Nagarajan | |
| 9,454,059 B1 | 9/2016 | Nagarajan | |
| 9,503,195 B2 | 11/2016 | Hu et al. | |
| 2009/0263142 A1 * | 10/2009 | Shen | G02F 1/225 398/158 |
| 2012/0195544 A1 * | 8/2012 | Shen | G02F 2/00 385/3 |
| 2013/0209021 A1 * | 8/2013 | Hayashi | G02F 1/011 385/2 |
| 2014/0293393 A1 * | 10/2014 | Fondeur | G02F 1/21 359/288 |

(Continued)

OTHER PUBLICATIONS

MacKay, "Complex Phase Biasing of Silicon Mach-Zhender Interferometer Modulators," Thesis, University of Toronto, 2014, 85 pages.

(Continued)

*Primary Examiner* — Andrew Jordan
(74) *Attorney, Agent, or Firm* — Conley Rose, P.C.

(57) ABSTRACT

A technique for tuning a silicon photonics (SiP) based nested (parent/child) Mach-Zehnder modulator (MZM). The technique includes a sequence of applying dither tones on individual arms of the child MZMs, observing changes in the output of the MZM, and adjusting the MZM until reaching the null points for the child MZMs and the quad point for the parent MZM.

21 Claims, 7 Drawing Sheets

(56) References Cited

U.S. PATENT DOCUMENTS

| | | | |
|---|---|---|---|
| 2015/0215048 A1* | 7/2015 | Zhang | H04B 10/50575 398/38 |
| 2015/0244468 A1* | 8/2015 | Mak | H04B 10/5055 398/184 |
| 2016/0062208 A1* | 3/2016 | Fondeur | G02F 1/21 385/1 |
| 2016/0127070 A1* | 5/2016 | Nagarajan | G02F 1/025 398/82 |

OTHER PUBLICATIONS

Garcia, "Optical Phase Synchronization in Coherent Optical Beamformers for Phased Array Receive Antennas," University of Twente, Master Thesis, Executed from Sep. 2008 to Feb. 2009, 96 pages.

* cited by examiner

OPTICAL N-LEVEL QUADRATURE AMPLITUDE MODULATION (NQAM) TUNED BY DITHERING ASSOCIATED HEATERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When light passes through a transparent material, its speed decreases in proportion to the refractive index of the material. The refractive index of certain materials will vary in the presence of electric fields and/or heat. In a typical conventional electro-optic modulator, light passes through a waveguide made of lithium niobate ($LiNbO_3$). By selectively applying an electric field to the waveguide, the light passing through the waveguide will slow, thus changing the phase of the light exiting the waveguide. By varying the electric field according to a digital data signal, the light exiting the waveguide becomes a modulated carrier wave that carries the digital data signal.

In a Mach-Zehnder modulator (sometimes called a "Mach-Zehnder interferometer" or simply "MZM"), an input light signal is split into two waveguides. For example, FIG. 1 discloses a conventional Mach-Zehnder modulator 1 having waveguide upper arm 110 and waveguide lower arm 120. Upper arm 110 has segment 112, made of $LiNbO_3$, that is coupled to high speed data signal 113. High speed data signal 113 creates an electric field affecting segment 112 proportional to high speed data signal 113. Similarly, lower arm 120 has segment 122, made of $LiNbO_3$, that is coupled to high speed data signal 123. High speed data signal 123 creates an electric field affecting segment 122 proportional to high speed data signal 123. In a "push-pull" modulator, high speed data signal 123 is the inverted version of high speed data signal 113.

Figure 1:
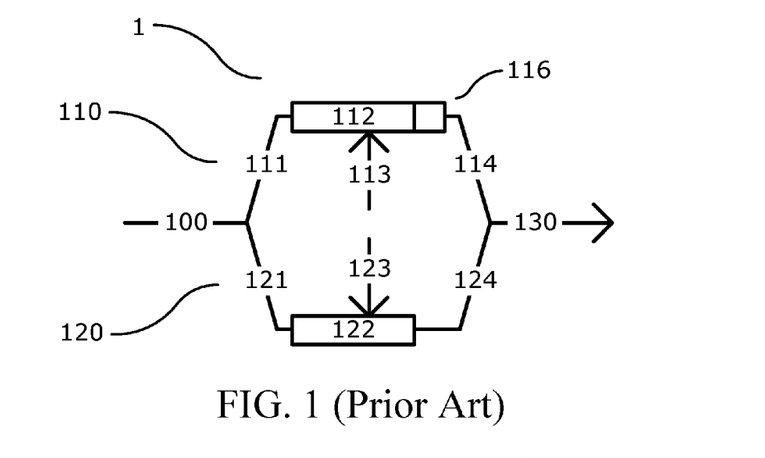
FIG. 1 is a conventional Mach-Zehnder modulator.

The light signal of carrier wave 100 splits into light signals 111 and 121, which pass through upper arm 110 and lower arm 120 respectively. As light signal 111 passes through segment 112, its phase changes according to the electric field created by high speed data signal 113. Similarly, as light signal 121 passes through segment 122, its phase changes according to the electric field created by high speed data signal 123. Light signals 114 and 124 are rejoined to produce modulated light signal 130.

Ideally, when there are no electric fields created by high speed data signals 113 and 123, light signals 114 and 124 remain in phase; that is, the sine wave of light signal 114 crosses 0° at the same time the sine wave of light signal 124 crosses 0, and the modulator is said to be operating at its "working point." Thus, when high speed data signals 113 and 123 are applied to segments 112 and 122 respectively, the resulting modulated light signal 130 will have a recognizable wave form that a receiver can accurately interpret to extract the original data represented by high speed data signals 113 and 123.

However, for a variety of reasons, including manufacturing imperfections, temperature changes, mechanical stresses, and mechanical vibrations, phase shifts in the upper arm 110 and/or lower arm 120 cause light signals 114 and 124 to be out of phase, making it difficult or impossible to demodulate light signal 130 accurately. In order to "tune" light signals 114 and 124 back to the working point, a typical prior art system will add a "dither tone" of known amplitude and frequency, monitor the output signal for the presence of the dither tone, and adjust the bias voltage (that is, the baseline voltage applied to segments 112 and 122) to bring the system back to a known working point. Periodically checking the output of a signal and adjusting the bias voltage accordingly helps keep the output signals 114 and 124 in phase. Alternatively, because the refractive index of certain materials will vary in the presence of heat, the phase of one arm can be tuned by adjusting heater 116 on the top arm.

Figure 2:
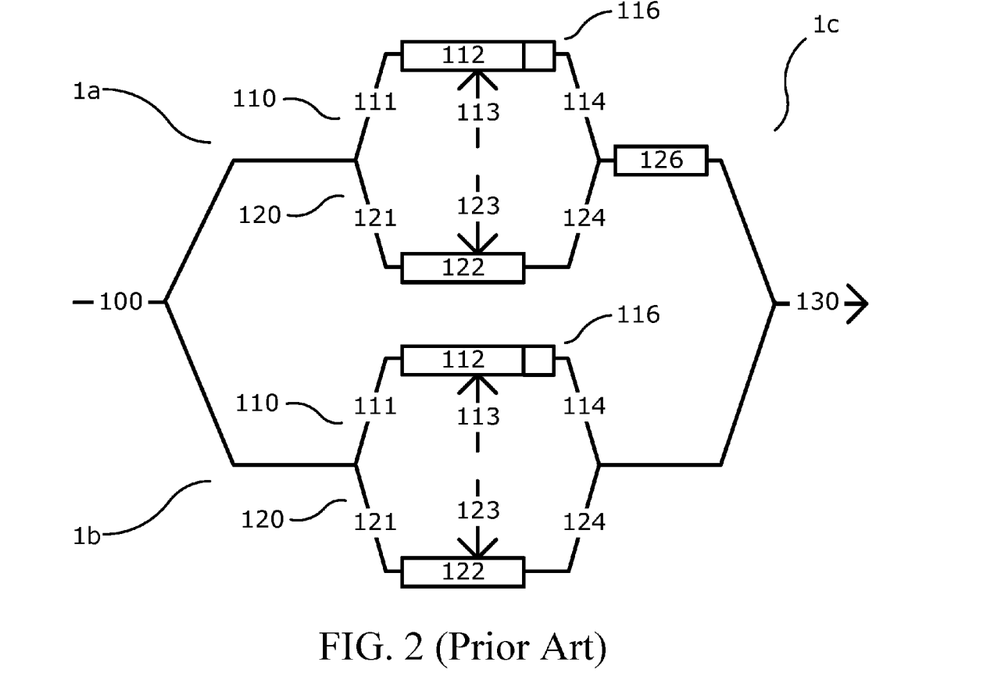
FIG. 2 is a conventional quadrature phase shift keying (QPSK) modulator.

FIG. 2 discloses a conventional quadrature phase shift keying (QPSK) modulator 2 that essentially consists of two (child) Mach-Zehnder modulators 1a and 1b (with elements of each numbered as in the modulator 1 in FIG. 1) in parallel with one another, nested together to form a third (parent) Mach-Zehnder modulator 1c. In this configuration, Mach-Zehnder modulator 1a performs an in-phase (I) modulation and Mach-Zehnder modulator 1b performs a quadrature phase (Q) modulation; that is, the Q phase is 90° out of phase with respect to the I phase. Thus, the working points for 1a and 1b (the "child arms") are 0° and the working point for 1c (the "parent arm") is 90°. This configuration, commonly referred to as an IQ modulator, includes an additional heater 126. Modulator 2 can be dynamically tuned using the same general mechanisms as described for the modulator in FIG. 1.

A $LiNbO_3$ modulator can be phase tuned using dither tones and adjusting bias voltage on both the top and bottom arms of the modulator. Because the phase change has a linear dependence on the voltage/electrical field, phase modulation and control is straightforward and mathematically resolvable. In contrast, silicon photonics (SiP) modulators typically use dithering and heaters on the waveguides for phase tuning. Because the phase change has a quadratic dependent to the heating voltage, phase modulation and control is not straightforward and not easily mathematically resolvable. Further complicating tuning, SiP modulators may use a single arm phase heater to simplify both the chip design and the driver circuit design.

What is needed, therefore, is a mechanism for locking in the phases of a SiP modulator that will work irrespective of the initial difference between the phases.

SUMMARY

In one embodiment, a controller for a nested Mach-Zehnder modulator (MZM) comprises an optical monitor and a processor. The nested MZM comprises an input waveguide, an output waveguide, a first child MZM, and a second child MZM. The first child MZM comprises an input waveguide, an output waveguide, two arms, and a first heater on one arm, and the first child MZM provides the in-phase (I) modulation. The second child MZM comprises an input waveguide, an output waveguide, two arms, and a second heater on one arm, and the second child MZM provides the quadrature phase (Q) modulation. The nested MZM further comprises a third heater on one of the output waveguide of the first child MZM and the output waveguide of the second child MZM. In this embodiment, the optical monitor is coupled with the output waveguide of the nested MZM, the processor is coupled with the first heater, the second heater, the third heater, and the optical monitor, the optical monitor is configured to measure an optical signal on the output waveguide of the nested MZM, and the processor is configured to determine a P phase quad point, determine an I phase null point, and determine a Q phase null point.

In a variation on this embodiment, to determine the P phase quad point, the processor is configured to cause the first heater to apply a first dither tone, scan the second heater, record a first curve according to the optical signal measured by the optical monitor, cause the second heater to apply a second dither tone, scan the second heater, record a second curve according to the optical signal measured by the optical monitor, adjust the temperature of the third heater when the phase difference between the first curve and second curve is not equal to ninety degrees, and determine the P phase quad point when the phase difference between the first curve and second curve is equal to ninety degrees. In a related variation, the optical monitor measures an output intensity of the optical signal, the phase of the first dither tone, and the phase of the second dither tone, the first curve is a plot of the first order differential of the output intensity to the first order differential of the phase of the first dither tone, and the second curve is a plot of the first order differential of the output intensity to the first order differential of the phase of the second dither tone. In a related variation, an output intensity $I_{out}$ of the optical signal is described by the relationship of equation 3 (defined later in this patent specification). In a related variation, a first order differential of the output intensity $dI_{out}$ relates to a first order differential of the phase of the first dither tone $d\phi_{HI}$ according to the relationship of equation 7 (defined later in this patent specification).

In a variation on this embodiment, to determine the I phase null point, the processor is further configured to cause the first heater to apply a third dither tone, scan the second heater, record a third curve according to the optical signal measured by the optical monitor, adjust the second heater to the point where the third curve reaches a maximum value, cause the first heater to apply a fourth dither tone, scan the first heater, record a fourth curve according to the optical signal measured by the optical monitor, and determine the I phase null point as a point where the fourth curve crosses zero. In a related variation, the optical monitor measures an output intensity of the optical signal, the phase of the third dither tone, and the phase of the fourth dither tone, the third curve is a plot of the first order differential of the output intensity to the first order differential of the phase of the third dither tone, and the fourth curve is a plot of the first order differential of the output intensity to the first order differential of the phase of the fourth dither tone. In a related variation, the processor is further configured to adjust the third heater in step with adjusting the first heater.

In a variation on this embodiment, to determine the Q phase null point, the processor is further configured to adjust the first heater to the I phase null point, cause the second heater to apply a fifth dither tone, scan the second heater, record a fifth curve according to the optical signal measured by the optical monitor, and determine a point where the fifth curve crosses zero as the Q phase null point. In a related variation, the optical monitor measures an output intensity of the optical signal and the phase of the fifth dither tone and the fifth curve is a plot of the first order differential of the output intensity to the first order differential of the phase of the fifth dither tone. In a related variation, the processor is further configured to adjust the third heater in step with adjusting the second heater.

In another embodiment, a method to tune a nested Mach-Zehnder modulator (MZM) comprises applying a first dither tone by a first heater, scanning a second heater, recording a first curve according to an optical signal output by the nested MZM, applying a second dither tone by the second heater, scanning the second heater, recording a second curve according to the optical signal output by the nested MZM, adjusting the temperature of a third heater when the phase difference between the first curve and the second curve is not equal to ninety degrees, and determining the parent phase (P) quad point when the phase difference between the first curve and the second curve is equal to ninety degrees. In this embodiment, the first heater is on one arm of a first child MZM, the first child MZM provides the in-phase (I) modulation for the nested MZM, the second heater is on one arm of a second child MZM, the second child MZM provides the quadrature phase (Q) modulation for the nested MZM, and the third heater is on an output waveguide of one of the first child MZM and the second child MZM, In a related variation, recording the first curve and the second curve further comprises measuring an output intensity of the optical signal, the first curve is a plot of the first order differential of the output intensity to the first order differential of the phase of the first dither tone, and the second curve is a plot of the first order differential of the output intensity to the first order differential of the phase of the second dither tone. In a related variation, an output intensity $I_{out}$ of the optical signal is described by the relationship of equation 3 (defined later in this patent specification). In a related variation, a first order differential of the output intensity $dI_{out}$ relates to a first order differential of the phase of the first dither tone $d\phi_{HI}$ according to the relationship of equation 7 (defined later in this patent specification).

In a variation on this embodiment, the method determines the I phase null point by applying a third dither tone by the first heater, scanning the second heater, recording a third curve according to the optical signal output by the nested MZM, adjusting the second heater to a point where the third curve reaches a maximum value, applying a fourth dither tone by the first heater, scanning the first heater, recording a fourth curve according to the optical signal output by the nested MZM, and determining the I phase null point as a point where the fourth curve crosses zero. In a related variation, recording the third curve and the fourth curve further comprises measuring an output intensity of the optical signal, the third curve is a plot of the first order differential of the output intensity to the first order differential of the phase of the third dither tone, and the fourth curve is a plot of the first order differential of the output intensity to the first order differential of the phase of the fourth dither tone. In a related variation, the method further comprises adjusting the third heater in step with adjusting the first heater or the second heater.

In a variation on this embodiment, the method determines the Q phase null point by adjusting the first heater to the I phase null point, applying a fifth dither tone by the second heater, scanning the second heater, recording a fifth curve according to the optical signal measured by the optical monitor, determining a point where the fifth curve crosses zero as the Q phase null point. In a related variation, recording the fifth curve according to the optical signal further comprises measuring an output intensity of the optical signal and the fifth curve is a plot of the first order differential of the output intensity to the first order differential of the phase of the fifth dither tone.

In another embodiment, a controller for tuning a nested Mach-Zehnder modulator (MZM), the controller comprises a non-transitory memory storage comprising instructions and one or more processors in communication with the memory. The one or more processors execute the instructions to apply a first dither tone by a first heater, scan a second heater, record a first curve according to an optical signal output by the nested MZM, apply a second dither tone by the second heater, scan the second heater, record second curve according to the optical signal output by the nested MZM, adjust the temperature of a third heater when the phase difference between the first curve and the second curve is not equal to ninety degrees, and determine a parent phase (P) quad point when the phase difference between the first curve and the second curve is equal to ninety degrees. In this embodiment, the first heater is on one arm of a first child MZM, wherein the first child MZM provides the in-phase (I) modulation for the nested MZM, the second heater is on one arm of a second child MZM, the second child MZM provides the quadrature phase (Q) modulation for the nested MZM, and the third heater is on an output waveguide of one of the first child MZM and the second child MZM.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 3:
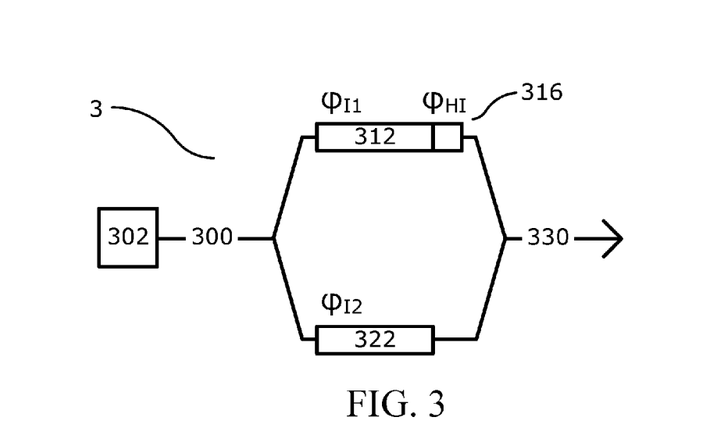
FIG. 3 is a SiP-based Mach-Zehnder modulator according to the present disclosure.

In an embodiment of the present inventions, first consider a SiP-based Mach-Zehnder modulator 3 shown in FIG. 3 (some implementation details have been omitted for simplicity). Coherent light 300 is generated from light source 302, and is split to two silicon waveguides. Upper arm phase shifter 312 and lower arm phase shifter 322 of the silicon waveguides have been doped to form a pn junction across the waveguide so that when the doped segment is exposed to an electric field, the refractive index of the segment changes in proportion to the electric field. Thus, as coherent light passes through the doped segment, the phase of the light changes according to the length of the segment and the electric field. In addition, heater 316 of one of the silicon waveguide has a doped structure near the waveguide so that when this segment is heated through the application of external voltage, the refractive index of the segment changes quadratically with respect to the heating voltage. The heat can be provided by a resistive metallic heater or a doped semiconductor layer adjacent to segment or by other heating means known to one of ordinary skill. There is a phase shift $\phi_{I1}$ associated with the upper arm phase shifter 312, a phase shift $\phi_{I2}$ associated with the lower arm phase shifter 322, and a phase shift $\phi_{HI}$ associated with the heater 316. The electrical field strength $E_I$ of the output at 330 is described as:

$$E_I = e^{i(\varphi_{I1}+\varphi_{HI})} + e^{i(\varphi_{I2})} = 2 \cdot \cos\frac{\varphi_{I1}+\varphi_{HI}-\varphi_{I2}}{2} \cdot e^{i\left(\frac{\varphi_{I1}+\varphi_{I2}+\varphi_{HI}}{2}\right)} \quad \text{(eq. 1)}$$

where e is Euler's number and i the imaginary unit. As can be seen by this equation, the exiting amplitude is the function of the delta of the upper arm phase shifter 312 and the lower arm phase shifter 322 of the modulator and the exiting phase is the average phase of the upper and lower arms of the modulator. For push-pull type modulators, $\phi_{I1}+\phi_{I2}$ is constant and $\phi_{I1}-\phi_{I2}$ varies as the modulation changes. A change in $\phi_{HI}$ will necessarily result in a change not only in the electrical field but also the amplitude.

Figure 4:
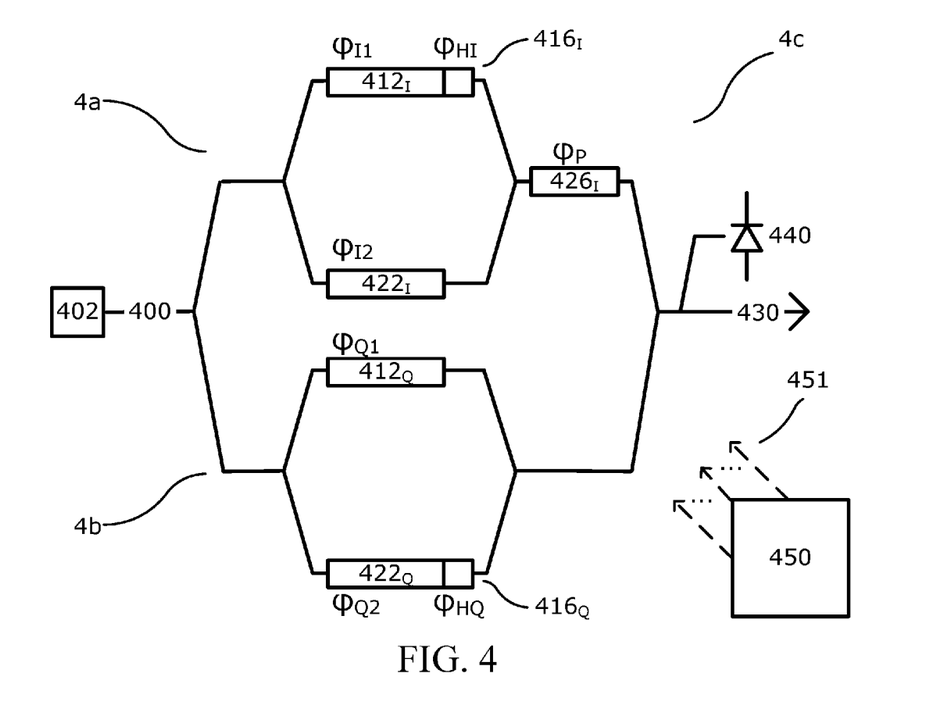
FIG. 4 is a SiP-based IQ Mach-Zehnder modulator according to the present disclosure.

The electrical field strength for a nested Mach-Zehnder modulator, as might be used in a QPSK application, is similar. FIG. 4 shows a nested Mach-Zehnder modulator having child modulators 4a and 4b forming a parent modulator 4c (again, some of the implementation details have been omitted). Like the modulator of FIG. 3, there are phase shifts $\phi_{I1}$ and $\phi_{Q1}$ associated with the upper arm phase shifters $412_I$ and $412_Q$, phase shifts $\phi_{I2}$ and $\phi_{Q2}$ associated with the lower arm phase shifters $422_I$ and $422_Q$, phase shift $\phi_{HI}$ and $\phi_{HQ}$ associated with heaters $416_I$ and $416_Q$, and phase shift $\phi_P$ associated with heater $426_I$. An optical monitor, tapped photodiode 440, has been added to monitor the throughput power at 430. The electric field strength E is described as:

$$E = E_I e^{i(\varphi_P)} + E_Q \quad \text{(eq. 2)}$$

$$= 2 \cdot \cos\frac{\varphi_{I1}+\varphi_{HI}-\varphi_{I2}}{2} \cdot e^{i\left(\frac{\varphi_{I1}+\varphi_{I2}+\varphi_{HI}+2\varphi_P}{2}\right)} +$$

$$2 \cdot \cos\frac{\varphi_{I1}+\varphi_{HQ}-\varphi_{Q2}}{2} \cdot e^{i\left(\frac{\varphi_{Q1}+\varphi_{Q2}+\varphi_{HQ}}{2}\right)}$$

Then the output intensity $I_{out}$ is described as:

$$I_{out} = \quad \text{(eq. 3)}$$
$$4 \cdot \cos^2\left[\frac{\varphi_{HI}+\Delta\varphi_I}{2}\right] + 4 \cdot \cos^2\left[\frac{\varphi_{HQ}+\Delta\varphi_Q}{2}\right] + 4 \cdot \cos\left[\frac{\varphi_{HI}+\Delta\varphi_I}{2}\right] \cdot$$
$$\cos\left[\frac{\varphi_{HQ}+\Delta\varphi_Q}{2}\right] \cdot 2 \cdot \cos\left[\frac{\varphi_M+\varphi_{HI}+2\cdot\varphi_P}{2} - \frac{\varphi_M+\varphi_{HQ}}{2}\right]$$

where $\Delta\phi_I = \Delta\phi_{I1} - \Delta\phi_{I2}$, $\Delta\phi_Q = \phi_{Q1} - \phi_{Q2}$, and $\phi_M = \phi_{I1} + \phi_{I2} = \phi_{Q1} + \phi_{Q2}$.

The foregoing equations for E and $I_{out}$ (eq. 2 and eq. 3) are applicable for both high-speed (several dozen gigahertz range) and low-speed (kilohertz range) electro-optical signal transformation.

By applying low frequency dither tones and monitoring the power response, the working point condition can be located. Following eq. 3, this leads to:

$$\frac{dI_{out}}{d\varphi_{HI}} = -2 \cdot \sin[\varphi_{HI} + \Delta\varphi_I] - 2 \cdot \left[\varphi_{HI} + \varphi_P - \varphi_{HQ} + \frac{\Delta\varphi_I - \Delta\varphi_Q}{2}\right] - \sin\left[\varphi_{HI} + \varphi_P + \frac{\Delta\varphi_I + \Delta\varphi_Q}{2}\right]$$ (eq. 4)

Because the frequency of the RF modulation is a few orders of magnitude higher than the frequency of the dither tone, a quadrature phase average can be applied to the response signal to yield:

$$\frac{dI_{out}}{d\varphi_{HI}} = -8\sin[\varphi_{HI}]\cos[|\Delta\varphi_I|] \pm 16 \cdot \sin\left[\varphi_{HI} + \varphi_P + \frac{\varphi_{HQ}}{2}\right] \cdot \cos\left[\frac{\varphi_{HQ}}{2}\right]\cos\left[\frac{|\Delta\varphi_I|}{2}\right]\cos\left[\frac{|\Delta\varphi_Q|}{2}\right]$$ (eq. 5)

By setting the working point of $\phi_{HI}$ and $\phi_{HQ}$ equal to $\pi$ and $\phi_{HP}$ equal to $\pi/2$ into eq. 5, the first order term for output ($dI_{out}$) versus $\phi_{HI}$ phase dither ($d\phi_{HI}$) is then zero. Eq. 5 can be re-written similarly for $\phi_{HQ}$ phase dither ($d\phi_{HQ}$). Note that the "±" in eq. 5 depends on the phase arm location and the electrical wirings.

The second order differential on P with respect to dither tones on I and Q leads to:

$$\frac{d^2 I_{out}}{d\varphi_{HI} d\varphi_{HQ}} = 8 \cdot \cos[\varphi_{HI} + \varphi_P - \varphi_{HQ}] \cdot \cos\left[\frac{|\Delta\varphi_I|}{2}\right] \cdot \cos\left[\frac{|\Delta\varphi_Q|}{2}\right]$$ (eq. 6)

With this, the second order differential to the I and Q dither is zero when $\phi_{HI}+\phi_P-\phi_{HQ}=\pi/2$. Note in eq. 6 the strong phase coupling of $\phi_P$, $\phi_{HQ}$, $\phi_{HI}$. When tuning either of the child modulators 4a and 4b, the parent modulator 4c sees the impact of the changes to the child modulator heaters. Because of this, when adjusting the heaters $416_I$ and $416_Q$ on the child modulators 4a and 4b during tuning of the child modulators, the heater $426_I$ for the parent modulator 4c must be adjusted as well so that eq. 6 is kept at zero.

When $\phi_P=\phi_{P0}+\phi_{HQ}-\phi_{HI}$, eq. 5 can be rewritten for $\phi_{HQ}$ and $\phi_{HI}$ as follows:

$$\frac{dI_{out}}{d\varphi_{HI}} = -8\sin[\varphi_{HI}]\cos[|\Delta\varphi_I|] - 8 \cdot \{\sin[\varphi_{P0}] + \sin[\varphi_{P0} + \varphi_{HQ}]\}\cos\left[\frac{|\Delta\varphi_I|}{2}\right]\cos\left[\frac{|\Delta\varphi_Q|}{2}\right]$$ (eq. 7)

$$\frac{dI_{out}}{d\varphi_{HQ}} = -8\sin[\varphi_{HQ}]\cos[|\Delta\varphi_Q|] - 8 \cdot \{\sin[\varphi_{P0}] + \sin[\varphi_{P0} + \varphi_{HI}]\}\cos\left[\frac{|\Delta\varphi_I|}{2}\right]\cos\left[\frac{|\Delta\varphi_Q|}{2}\right]$$ (eq. 8)

At the working point, $\phi_{HI}$ and $\phi_{HQ}$ equal $\pi$ and $\phi_P$ equals $\pi/2$, and both eq. 7 and eq. 8 are zero. $\phi_{HI}$ equals $\pi$ and $\phi_P$ equals $\pi/2$, so when "scanning" $\phi_{HQ}$ for 360 degrees, eq. 7 contains a cosine term and eq. 8 contain a sine term on $\phi_{HQ}$. ("Scanning" in this context, refers to sequentially increasing voltages or currents, typically in linear equal spaced increments, and retrieving the response.) Therefore eq. 7 and eq. 8 have a 90 degree phase shift. The first order differential to $\phi_{HQ}$ cross zero, and the first order differential to $\phi_{HI}$ has a maximum at $\phi_{HQ}$ of 180 degrees, which is the null working point for $\phi_{IQ}$. When $\phi_{HI}$ is not equal to $\pi$ but $\phi_P$ equals $\pi/2$, when scanning $\phi_{IQ}$ for 360 degrees, the first order differential to $\phi_{HQ}$ does not cross zero, but the first order differential to $\phi_{HI}$ has a maximum at $\phi_{HQ}$ of 180 degrees which, again, is the null working point for $\phi_{IQ}$.

Once P is at the quad point ($\pi/2$), $\phi_{HQ}$ can be scanned to determine the maximum value to get a "course scan" where the phase of $\phi_{IQ}$ is $\pi$. After setting $\phi_{HQ}$, $\phi_{HI}$ can be scanned to get a "fine scan" where the phase of $\phi_{HI}$ is $\pi$.

An embodiment of the foregoing is shown in FIGS. 4-9. In FIG. 4, control circuit 450 is electrically coupled with the other components shown in FIG. 4, including light source 402 producing coherent light signal 400, phase shifters $412_I$, $412_Q$, $422_I$, and $422_Q$, heaters $416_I$ and $416_Q$, and $426_I$, and tapped photodiode 440. Control circuit 450 can be a digital signal processor, a microcontroller, an application specific integrated circuit, or any other component (or combination of components) known to one of ordinary skill for receiving and sending electrical signals and performing calculations. The electrical coupling between control circuit 450 and the other components in FIG. 4 (suggested by the plurality of dashed lines 451) can be direct or indirect and can use any form of connectivity known to one of ordinary skill. In this embodiment, modulator 4c of FIG. 4 is tuned such that $\phi_{HI}$ and $\phi_{HQ}$ are at null (0°) when $\phi_P$ is at $\pi/2$ (90°).

Figure 5A:
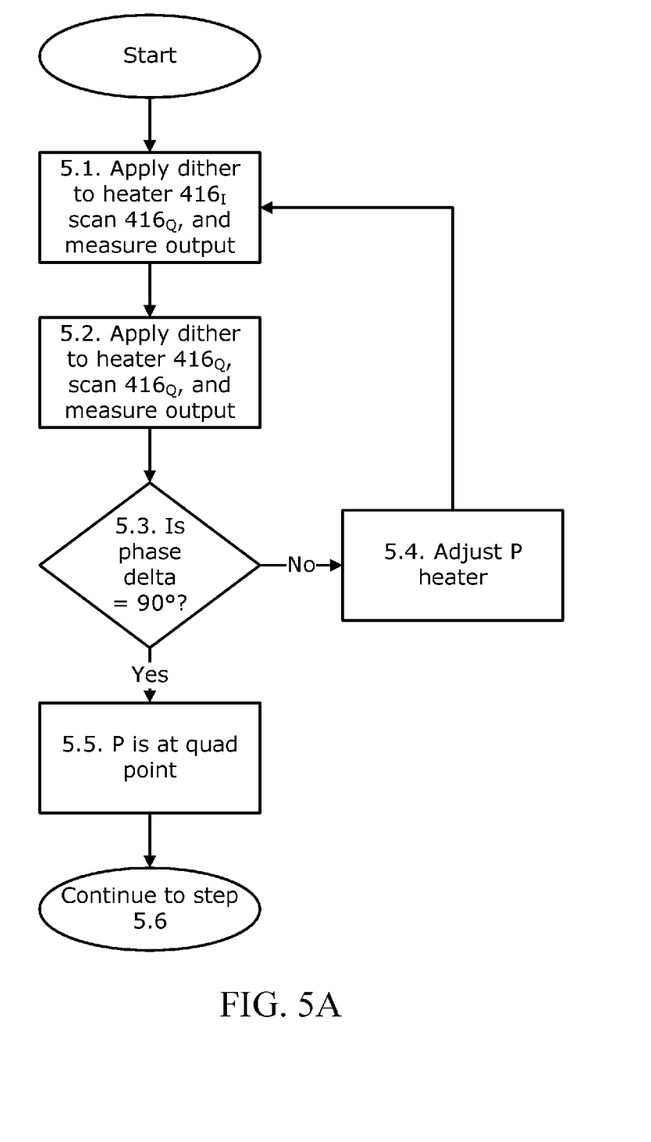
FIGS. 5A-5C disclose a flowchart for tuning an IQ Mach-Zehnder modulator according to an embodiment of the present disclosure.
Figure 5B:
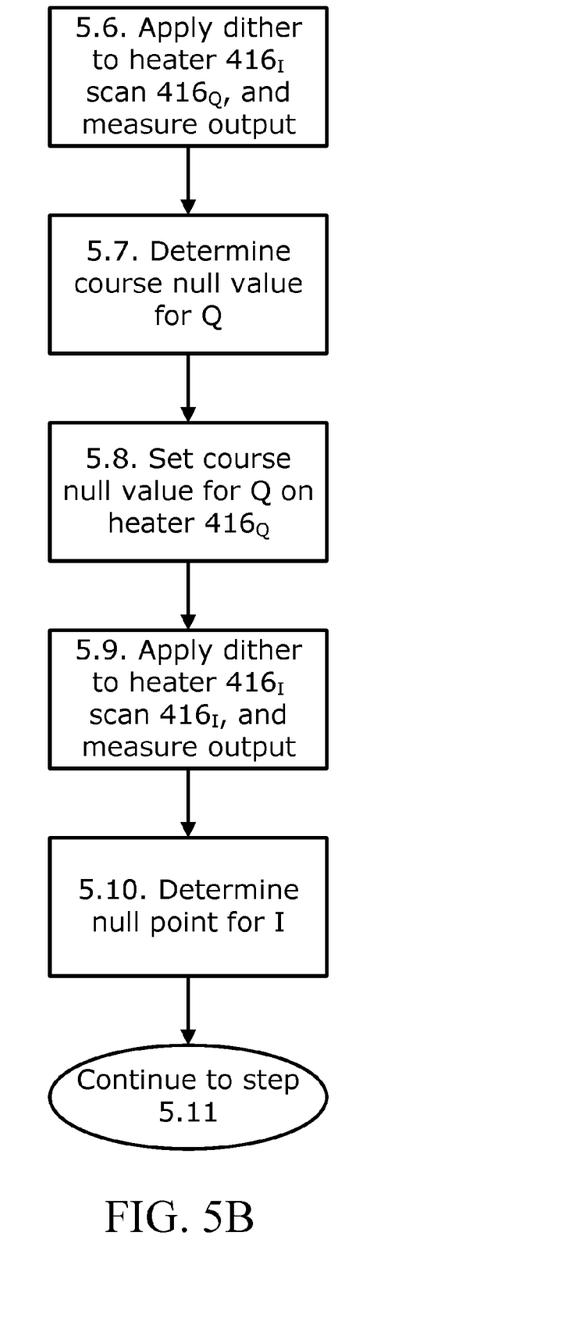
Figure 5C:
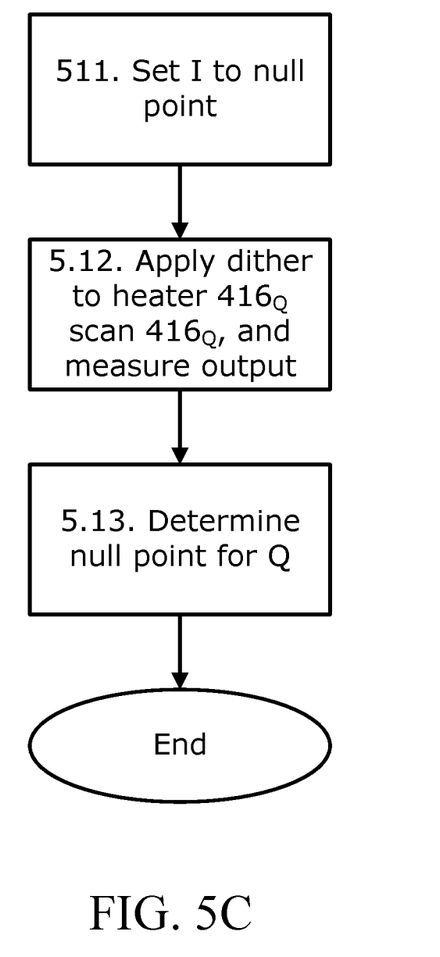
Figure 6:
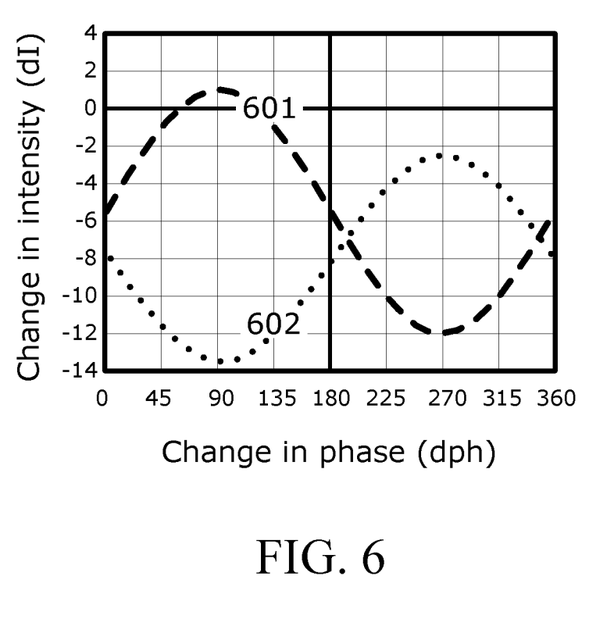
FIG. 6-9 are exemplary plots of curves recorded during the course of tuning an IQ Mach-Zehnder modulator according to an embodiment of the present disclosure.
Figure 7:
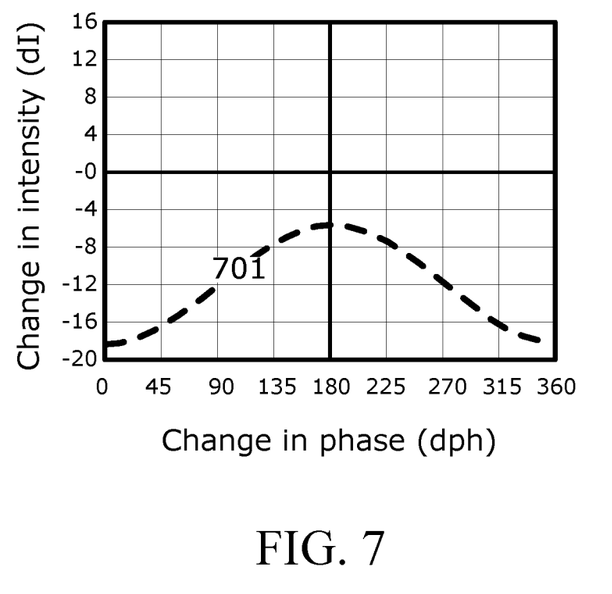
Figure 8:
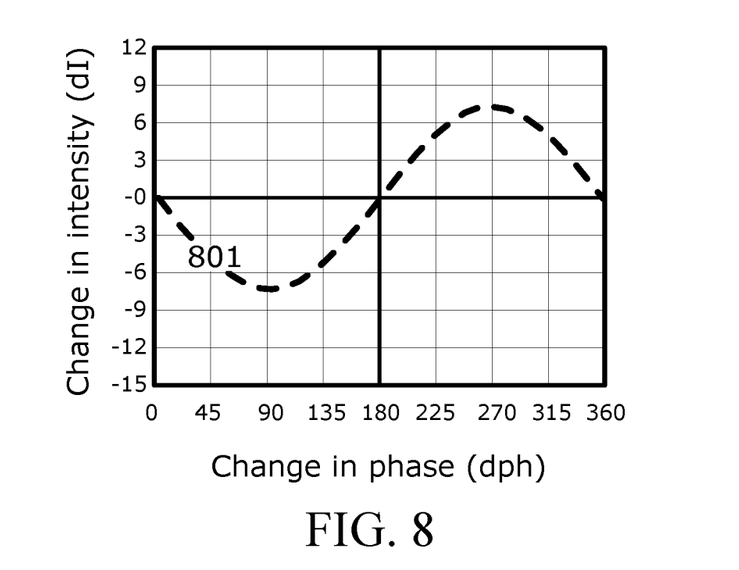
Figure 9:
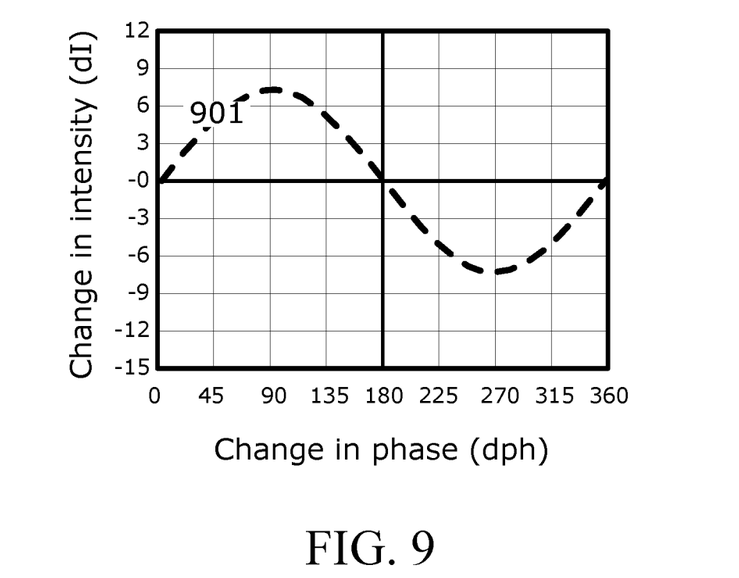

FIGS. 5A through 5C shows a flowchart of the steps for tuning in this embodiment. First, control circuit 450 tunes the P phase according to steps 5.1 through 5.5. In step 5.1, a dither tone is applied by heater $416_I$, heater $416_Q$ is scanned, and the modulator output at photodiode 440 is recorded. Applying eq. 8, this should result in a curve like curve 601 as shown in FIG. 6. In step 5.2, a dither tone is applied by heater $416_Q$, heater $416_Q$ is scanned, and the modulator output at photodiode 440 is recorded. Applying eq. 7, this should result in a curve like curve 602 as shown in FIG. 6. In Step 5.3, the phase difference between the two curves is measured. If the phase difference is 90 degrees, then P is tuned and the process moves to step 5.5. If the phase difference is not 90 degrees, then in step 5.4 heater $426_I$ is adjusted and steps 5.1 through 5.3 are repeated until the phase difference is 90 degrees. At step 5.5, once the phase difference is 90 degrees, then P is at the quad point. Note that alternatively, instead of scanning $416_Q$ in steps 5.1 and 5.2, $416_I$ could be scanned.

Next, control circuit 450 tunes the I phase according to steps 5.6 through 5.10. In step 5.6, a dither tone is applied by heater $416_I$, heater $416_Q$ is scanned, and the modulator output at photodiode 440 is recorded. Applying eq. 7, this should result in curve 701 in FIG. 7. In step 5.7, the value of Q is determined where curve 701 reaches its maximum value. This value of Q is the "course null value" for Q. In step 5.8, the course null value determined in step 5.7 is set on heater $416_Q$. In step 5.9, a dither tone is applied by heater $416_I$, heater $416_I$ is scanned, and the modulator output at photodiode 440 is recorded. Applying eq. 7, this should result in curve like curve 801 in FIG. 8. In step 5.10, the value of I is determined where curve 801 crosses zero. This value is the null point for I.

Finally, control circuit 450 tunes the Q phase according to steps 5.11 through 5.13. First, in step 5.11, I is set to the I phase null point as determined in step 5.10. In step 5.12, a dither tone is applied by heater $416_Q$, heater $416_Q$ is scanned, and the modulator output at photodiode 440 is recorded. Applying eq. 8, this should result in a curve like curve 901 in FIG. 9. In step 5.13, the value of Q is determined where curve 901 crosses zero. This value is the null point for Q.

Note that when adjusting the I and Q phase on heaters 416$_I$ and 416$_Q$, the phase of P on heater 4261 may be impacted by the phase leak from the child modulator phase tune in. To compensate, the P phase of heater 426$_I$ can be adjusted so that the parent modulator quad point remains locked. Typically a 1:1 degree compensation will keep the parent modulator quad point locked.

The foregoing embodiment can also be adopted for other modulator configurations. By way of example and not limitation, this embodiment could be applied to tune a dual-polarization IQ modulator, in which case the steps disclosed in FIG. 5 could be performed on the X-polarization signal multiplexing with identical steps on the Y-polarization signal. Further, by way of example and not limitation, this embodiment could be applied to tune the modulator in a wavelength division multiplexing system, in which case the steps disclosed in FIG. 5 could be performed on the output of each of the modulators prior to multiplexing of the signals.

Disclosed herein is a controller for a nested Mach-Zehnder modulator (MZM) comprising a means for monitoring the optical signal output by the MZM, a means for tuning determining a P phase quad point, a means for determining an I phase null point, and a means for determine a Q phase null point.

Further disclosed herein is a method to tune a nested Mach-Zehnder modulator (MZM) comprising a means for applying a first dither tone by a first heater, a means for scanning a second heater, a means for recording a first curve according to an optical signal output by the nested MZM, a means for applying a second dither tone by the second heater, a means for scanning the second heater, a means for recording a second curve according to the optical signal output by the nested MZM, a means for adjusting the temperature of a third heater when the phase difference between the first curve and the second curve is not equal to ninety degrees, wherein the third heater is on an output waveguide of one of the first child MZM and the second child MZM, and a means for determining the parent phase (P) quad point when the phase difference between the first curve and the second curve is equal to ninety degrees.

Further disclosed herein is a controller for tuning a nested Mach-Zehnder modulator (MZM) controller comprising a means for storing instructions, a means for executing instructions, a means for applying a first dither tone by a first heater, a means for scanning a second heater, a means for recording a first curve according to an optical signal output by the nested MZM, a means for applying a second dither tone by the second heater, a means for scanning the second heater, a means for recording a second curve according to the optical signal output by the nested MZM, a means for adjusting the temperature of a third heater, and a means for determining a parent phase (P) quad point.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A controller for a nested Mach-Zehnder modulator (MZM), the controller comprising:
    an optical monitor; and
    a processor,
    wherein the nested MZM comprises:
        an input waveguide;
        an output waveguide;
        a first child MZM comprising an input waveguide, an output waveguide, two arms, and a first heater on one arm, wherein the first child MZM provides the in-phase (I) modulation;
        a second child MZM comprising an input waveguide, an output waveguide, two arms, and a second heater on one arm, wherein the second child MZM provides the quadrature phase (Q) modulation; and
        a third heater on one of the output waveguide of the first child MZM and the output waveguide of the second child MZM,
    wherein the optical monitor is coupled with the output waveguide of the nested MZM,
    wherein the processor is coupled with the first heater, the second heater, the third heater, and the optical monitor,
    wherein the optical monitor is configured to measure an optical signal on the output waveguide of the nested MZM, and
    wherein the processor is configured to:
        determine a P phase quad point;
        determine an I phase null point; and
        determine a Q phase null point.

2. The controller of claim 1, wherein to determine the P phase quad point, the processor is configured to:
    cause the first heater to apply a first dither tone;
    scan the second heater;
    record a first curve according to the optical signal measured by the optical monitor;
    cause the second heater to apply a second dither tone;
    scan the second heater;
    record a second curve according to the optical signal measured by the optical monitor;
    adjust the temperature of the third heater when the phase difference between the first curve and second curve is not equal to ninety degrees; and
    determine the P phase quad point when the phase difference between the first curve and second curve is equal to ninety degrees.

3. The controller of claim 2, wherein the optical monitor measures an output intensity of the optical signal, the phase of the first dither tone, and the phase of the second dither tone, wherein the first curve is a plot of the first order differential of the output intensity to the first order differential of the phase of the first dither tone, and wherein the second curve is a plot of the first order differential of the output intensity to the first order differential of the phase of the second dither tone.

4. The controller of claim 2, wherein an output intensity $I_{out}$ of the optical signal is described by the relationship:

$$I_{out} = 4 \cdot \cos^2\left[\frac{\varphi_{HI} + \Delta\varphi_I}{2}\right] + 4 \cdot \cos^2\left[\frac{\varphi_{HQ} + \Delta\varphi_Q}{2}\right] + 4 \cdot \cos\left[\frac{\varphi_{HI} + \Delta\varphi_I}{2}\right] \cdot$$
$$\cos\left[\frac{\varphi_{HQ} + \Delta\varphi_Q}{2}\right] \cdot 2 \cdot \cos\left[\frac{\varphi_M + \varphi_{HI} + 2 \cdot \varphi_P}{2} - \frac{\varphi_M + \varphi_{HQ}}{2}\right]$$

wherein $\phi_{HI}$, $\phi_{HQ}$, and $\phi_P$ are the phase shifts associated with the first, second, and third heaters, wherein $\Delta\phi_I$ is the difference in phase between the two arms of the first child MZM, wherein $\Delta\phi_Q$ is the difference in phase between the two arms of the second child MZM, and wherein $\phi_M$ is the sum of the phases at the two arms of the first child MZM and the two arms of the second child MZM.

5. The controller of claim 4, wherein a first order differential of the output intensity $dI_{out}$ relates to a first order differential of the phase of the first dither tone $d\phi_{HI}$ according to the relationship:

$$\frac{dI_{out}}{d\varphi_{HI}} = -8\,\sin[\varphi_{HI}]\cos[|\Delta\varphi_I|] -$$
$$8 \cdot \{\sin[\varphi_{P0}] + \sin[\varphi_{P0} + \varphi_{HQ}]\}\cos\left[\frac{|\Delta\varphi_I|}{2}\right]\cos\left[\frac{|\Delta\varphi_Q|}{2}\right]$$

wherein $\phi_{P0}$ is $\phi_P + \phi_{HI} - \phi_{HQ}$.

6. The controller of claim 2, wherein to determine the I phase null point, the processor is further configured to:
cause the first heater to apply a third dither tone;
scan the second heater;
record a third curve according to the optical signal measured by the optical monitor;
adjust the second heater to the point where the third curve reaches a maximum value;
cause the first heater to apply a fourth dither tone;
scan the first heater;
record a fourth curve according to the optical signal measured by the optical monitor; and
determine the I phase null point as a point where the fourth curve crosses zero.

7. The controller of claim 6, wherein the optical monitor measures an output intensity of the optical signal, the phase of the third dither tone, and the phase of the fourth dither tone, wherein the third curve is a plot of the first order differential of the output intensity to the first order differential of the phase of the third dither tone, and wherein the fourth curve is a plot of the first order differential of the output intensity to the first order differential of the phase of the fourth dither tone.

8. The controller of claim 6, wherein the processor is further configured to adjust the third heater in step with adjusting the first heater.

9. The controller of claim 6, wherein to determine the Q phase null point, the processor is further configured to:
adjust the first heater to the I phase null point;
cause the second heater to apply a fifth dither tone;
scan the second heater;
record a fifth curve according to the optical signal measured by the optical monitor; and
determine a point where the fifth curve crosses zero as the Q phase null point.

10. The controller of claim 9, wherein the optical monitor measures an output intensity of the optical signal and the phase of the fifth dither tone and wherein the fifth curve is a plot of the first order differential of the output intensity to the first order differential of the phase of the fifth dither tone.

11. The controller of claim 9, wherein the processor is further configured to adjust the third heater in step with adjusting the second heater.

12. A method to tune a nested Mach-Zehnder modulator (MZM), the method comprising:
applying a first dither tone by a first heater, wherein the first heater is on one arm of a first child MZM and wherein the first child MZM provides the in-phase (I) modulation for the nested MZM;
scanning a second heater, wherein the second heater is on one arm of a second child MZM and wherein the second child MZM provides the quadrature phase (Q) modulation for the nested MZM;
recording a first curve according to an optical signal output by the nested MZM;
applying a second dither tone by the second heater;
scanning the second heater;
recording a second curve according to the optical signal output by the nested MZM;
adjusting the temperature of a third heater when the phase difference between the first curve and the second curve is not equal to ninety degrees, wherein the third heater is on an output waveguide of one of the first child MZM and the second child MZM; and
determining the parent phase (P) quad point when the phase difference between the first curve and the second curve is equal to ninety degrees.

13. The method of claim 12, wherein recording the first curve and the second curve further comprises measuring an output intensity of the optical signal, wherein the first curve is a plot of the first order differential of the output intensity to the first order differential of the phase of the first dither tone, and wherein the second curve is a plot of the first order differential of the output intensity to the first order differential of the phase of the second dither tone.

14. The method of claim 13, wherein the output intensity $I_{out}$ of the optical signal is described by the relationship:

$$I_{out} = 4 \cdot \cos^2\left[\frac{\varphi_{HI} + \Delta\varphi_I}{2}\right] + 4 \cdot \cos^2\left[\frac{\varphi_{HQ} + \Delta\varphi_Q}{2}\right] + 4 \cdot \cos\left[\frac{\varphi_{HI} + \Delta\varphi_I}{2}\right] \cdot$$
$$\cos\left[\frac{\varphi_{HQ} + \Delta\varphi_Q}{2}\right] \cdot 2 \cdot \cos\left[\frac{\varphi_M + \varphi_{HI} + 2 \cdot \varphi_P}{2} - \frac{\varphi_M + \varphi_{HQ}}{2}\right]$$

wherein $\phi_{HI}$, $\phi_{HQ}$, and $\phi_P$ are the phase shifts associated with the first, second, and third heaters, wherein $\Delta\phi_I$ is the difference in phase between the two arms of the first child MZM, wherein $\Delta\phi_Q$ is the difference in phase between the two arms of the second child MZM, and wherein $\Delta\phi_Q$ is the sum of the phases at the two arms of the first child MZM and the two arms of the second child MZM.

15. The method of claim 14, wherein the first order differential of the output intensity $dI_{out}$ relates to the first order differential of the phase of the first dither tone $d\phi_{HI}$ according to the relationship:

$$\frac{dI_{out}}{d\varphi_{HI}} = -8\,\sin[\varphi_{HI}]\cos[|\Delta\varphi_I|] -$$
$$8 \cdot \{\sin[\varphi_{P0}] + \sin[\varphi_{P0} + \varphi_{HQ}]\}\cos\left[\frac{|\Delta\varphi_I|}{2}\right]\cos\left[\frac{|\Delta\varphi_Q|}{2}\right]$$

wherein $\phi_{P0}$ is $\phi_P + \phi_{HI} - \phi_{HQ}$.

16. The method of claim 12, further comprising:
applying a third dither tone by the first heater;
scanning the second heater;
recording a third curve according to the optical signal output by the nested MZM;
adjusting the second heater to a point where the third curve reaches a maximum value;
applying a fourth dither tone by the first heater;
scanning the first heater;
recording a fourth curve according to the optical signal output by the nested MZM; and
determining the I phase null point as a point where the fourth curve crosses zero.

17. The method of claim 16, wherein recording the third curve and the fourth curve further comprises measuring an output intensity of the optical signal, wherein the third curve is a plot of the first order differential of the output intensity to the first order differential of the phase of the third dither tone, and wherein the fourth curve is a plot of the first order differential of the output intensity to the first order differential of the phase of the fourth dither tone.

18. The method of claim 16, further comprising adjusting the third heater in step with adjusting the first heater or the second heater.

19. The method of claim 16, further comprising:
adjusting the first heater to the I phase null point;
applying a fifth dither tone by the second heater;
scanning the second heater;
recording a fifth curve according to the optical signal measured by the optical monitor;
determining a point where the fifth curve crosses zero as the Q phase null point.

20. The method of claim 19, wherein recording the fifth curve according to the optical signal further comprises measuring an output intensity of the optical signal and wherein the fifth curve is a plot of the first order differential of the output intensity to the first order differential of the phase of the fifth dither tone.

21. A controller for tuning a nested Mach-Zehnder modulator (MZM), the controller comprising:
a non-transitory memory storage comprising instructions; and
one or more processors in communication with the memory, wherein the one or more processors execute the instructions to:
apply a first dither tone by a first heater, wherein the first heater is on one arm of a first child MZM and wherein the first child MZM provides the in-phase (I) modulation for the nested MZM;
scan a second heater, wherein the second heater is on one arm of a second child MZM and wherein the second child MZM provides the quadrature phase (Q) modulation for the nested MZM;
record a first curve according to an optical signal output by the nested MZM;
apply a second dither tone by the second heater;
scan the second heater;
record a second curve according to the optical signal output by the nested MZM;
adjust the temperature of a third heater when the phase difference between the first curve and the second curve is not equal to ninety degrees, wherein the third heater is on an output waveguide of one of the first child MZM and the second child MZM; and
determine a parent phase (P) quad point when the phase difference between the first curve and the second curve is equal to ninety degrees.

\* \* \* \* \*